United States Patent [19]

Egashira

[11] Patent Number: 5,262,096
[45] Date of Patent: Nov. 16, 1993

[54] GAS DIFFUSION ARTICLE

[75] Inventor: Rie Egashira, Okayama, Japan

[73] Assignee: Japan Gore-Tex, Inc., Tokyo, Japan

[21] Appl. No.: 924,205

[22] Filed: Aug. 3, 1992

[30] Foreign Application Priority Data

Aug. 6, 1991 [JP] Japan .................................. 3-221127

[51] Int. Cl.$^5$ ................................................ B01F 3/04
[52] U.S. Cl. ................................ 261/122.1; 526/255
[58] Field of Search ...................... 261/122.1; 526/255

[56] References Cited

U.S. PATENT DOCUMENTS

| | | | |
|---|---|---|---|
| 3,644,231 | 2/1972 | Maruya et al. | 261/122.1 |
| 3,651,003 | 3/1972 | Bechtold | 526/255 |
| 3,953,566 | 4/1976 | Gore . | |
| 3,970,731 | 7/1976 | Oksman | 261/122.1 |
| 3,978,176 | 8/1976 | Voegeli | 261/122.1 |
| 4,082,893 | 4/1978 | Okita | 526/255 |
| 4,118,447 | 10/1978 | Richter | 261/122.1 |
| 4,187,390 | 2/1980 | Gore . | |
| 4,261,933 | 4/1981 | Ewing et al. | 261/122.1 |
| 4,923,679 | 5/1990 | Fukasawa et al. | 261/122.1 |
| 5,071,609 | 12/1991 | Tu et al. | 526/255 |
| 5,130,024 | 7/1992 | Fujimoto et al. . | |

FOREIGN PATENT DOCUMENTS

| | | |
|---|---|---|
| 0456939 | 11/1991 | European Pat. Off. . |
| 1295874 | 11/1972 | United Kingdom . |
| 1537448 | 12/1978 | United Kingdom . |

*Primary Examiner*—Tim Miles
*Attorney, Agent, or Firm*—Gary A. Samuels

[57] ABSTRACT

The present invention provides porous fluoropolymer articles for diffusion of gases into aqueous liquids whose surface is coated with a hydrophilic fluorine-containing copolymer.

9 Claims, No Drawings

GAS DIFFUSION ARTICLE

FIELD OF THE INVENTION

The present invention relates to a gas-diffusing article for dispersing bubbles in aqueous liquids.

BACKGROUND OF THE INVENTION

Porous materials are frequently used as spargers in aqueous liquid systems, for example, chemical reactors, biological reactors, wastewater treatment systems, fermentation systems, marine-life hatcheries, aqua-culture systems, and the like. The air or other gases introduced into the systems may be for the purpose of aeration of the liquid, or for reaction with the liquids and/or solids present, or may be introduced for mechanical purposes, such as agitation of the liquids or separation of solids from the liquids by flotation means. For reasons of effectiveness and efficiency it is generally desirable that the gases be diffused into the liquids and dispersed as fine bubbles.

Although porous plastics, porous glass, porous metals, porous ceramics, and the like, have been used as diffusion materials for sparging, they lack in certain areas and have not been entirely satisfactory. For example, hydrophobic porous plastic materials have the drawback that they generate large bubbles, typically 3 millimeters in diameter or larger. Hydrophobic porous plastic materials have the advantage, however, in that they resist penetration of water and other aqueous liquids into their pores. If the water penetration resistance of the porous material is greater than the pressure exerted by the liquid head above the sparger, gas flow through the diffusion material can be stopped or interrupted without a problem, and can be reinitiated by simply raising the gas supply pressure above the liquid head back-pressure.

On the other hand, hydrophilic porous materials such as porous glass, metals, or ceramics, have the advantage that they can generate fine bubbles, typically 1 millimeter diameter or less, however, when the gas flow is stopped or interrupted, water or aqueous liquids are drawn into or through the pores. This can cause problems by flooding the gas delivery system with liquid and, at the very least, requires much higher gas delivery pressure to expel the liquid from the pores and initiate gas flow through the diffusion material. Furthermore, when a higher gas delivery pressure is required to expel the liquid from the pores than is required to maintain gas flow through the pores, an uncontrolled flow surge of gas may take place as the liquid is expelled from the pores thereby causing undesirable or harmful turbulence in the liquid above the sparger.

SUMMARY OF THE INVENTION

The present invention provides a porous article for diffusion of air or other gases into water or aqueous liquids which generates and disperses fine bubbles into the liquid, resists penetration of water and aqueous liquids into its pores, and which requires low pressure to initiate flow of air or other gases into the liquid above it.

The porous diffusion article of the invention comprises a porous fluoropolymer article, such as a porous sheet or tube, having (a) one surface coated with a hydrophilic fluorine-containing copolymer comprising (i) units of a fluorine-containing monomer and (ii) units of a non-fluorinated vinyl monomer containing a hydrophilic functional group; wherein the amount of copolymer present is sufficient to impart increased hydrophilicity to the coated surface, and, (b) a hydrophobic second surface and internal structure resistant to wetting and penetration by water and aqueous liquids.

Another embodiment of the invention comprises a porous fluoropolymer tube, having on its outer surface a porous fluoropolymer sheet having continuous pores through the sheet, in which at least a portion of the interior of the sheet is coated with a hydrophilic fluorine-containing copolymer comprising (i) units of a fluorine containing monomer and (ii) units of a non-fluorinated vinyl monomer containing a hydrophilic functional group; wherein the amount of the copolymer present is sufficient to impart increased hydrophilicity to the fluoropolymer sheet.

The porous fluoropolymer article can be in sheet, tube, or plate form and, preferably is of porous polytetrafluoroethylene, more preferably, porous expanded polytetrafluoroethylene.

DESCRIPTION OF THE INVENTION

In accordance with the present invention, as long as continuous pores are present in the porous fluoropolymer article, the method for forming such pores is not restricted to a particular method. For example, stretching, i.e., expanding, or bubbling, or extraction, or the like may be used. The porous fluoropolymer article may be in the form of a film, sheet, tube, or plate. The kind of fluoropolymer resin used to make the fluoropolymer article is not restricted and a variety of fluoropolymer resins may be used. While the fluoropolymer resin preferably used to make the porous article of the present invention is polytetrafluoroethylene; in addition, tetrafluoroethylene/hexafluoropropylene copolymer, polyvinylfluoride, polyvinylidene fluoride, and the like, may also be used. Porous polytetrafluoroethylene is preferred, especially a porous expanded polytetrafluoroethylene.

The porous fluoropolymer article preferably used for the present invention is comprised of expanded polytetrafluoroethylene sheet or tubing having a porosity ranging usually from 15% to 95%, preferably from 50% to 95% and a pore diameter ranging usually from 0.02 to 100 microns, preferably from 0.02 to 50 microns. These materials are characterized by having a structure comprised of nodes interconnected with fibrils, and are described in U.S. Pat. No. 3,953,566 and U.S. Pat. No. 4,187,390.

Polytetrafluoroethylene is inherently hydrophobic and the porous expanded polytetrafluoroethylene sheet and tubing of the invention substantially resist penetration of water and aqueous liquids into their pores, however, only large bubbles can be generated and dispersed into aqueous liquids from their surfaces. In order for fine bubbles to be generated and dispersed into aqueous liquids the surface of the porous expanded polytetrafluoroethylene article exposed to the aqueous liquid is rendered hydrophilic by coating the surface with a hydrophilic material.

The hydrophilic fluorine-containing copolymer used to coat the surface of the porous fluoropolymer article may be a copolymer of a fluorine-containing ethylenically unsaturated monomer and a non-fluorinated vinyl monomer containing a hydrophilic group. It may be made by copolymerizing the monomers.

Preferably the fluorine-containing monomer of the fluorine-containing copolymer will be a vinyl monomer such as, for example, tetrafluoroethylene, vinyl fluoride, vinylidene fluoride, monochloro-trifluoroethylene, dichlorodifluoroethylene, hexafluoropropylene, and the like.

More preferably, the fluorine-containing vinyl monomer can be described as $$CXY = CFZ$$

wherein Z can be fluorine or hydrogen and X and Y can each be selected from hydrogen, fluorine, chlorine and $-CF_3$.

Other desirable fluorine-containing monomers useful herein include:

$$CH_2 = CR$$
$$\quad COORf$$
$$CH_2 = CR$$
$$\quad OCORf$$
$$CH_2 = CR$$
$$\quad O = C - Rf$$
$$CH_2 = CR$$
$$\quad O - Rf$$
$$CH_2 = CR$$
$$\quad CONHRf$$

In the above formulae, R is hydrogen, fluorine, a methyl group, an ethyl group, a trifluoroethyl group (($CF_3$), or pentafluoroethyl ($C_2F_5$). Rf is a perfluoroalkyl group with four to 21 carbons.

Meanwhile, examples of monomers that contain hydrophilic groups include those that have hydroxyl groups, carboxyl groups, sulfone groups, phosphoric acid groups, amide groups that may be N-substituted, and amino groups that may be N-substituted. Monomers in which an alkylene oxide such as ethylene oxide or propylene oxide has been subjected to an additional reaction with the active hydrogen in these groups are also favorable. Those that yield copolymers containing hydrophilic groups by performing first copolymerization and then hydrolysis, such as vinyl acetate, are also used.

Specific examples of these hydrophilic monomers include vinyl alcohol, acrylic acid, methacrylic acid, and other such unsaturated carboxylic acids, as well as alkylene oxide adducts of acrylic acid or methacrylic acid, such as those shown below.

$$CH_2 = CR$$
$$\quad COO(C_2H_4O)nH$$
$$CH_2 = CR$$
$$\quad COO(C_3H_6O)nH$$
$$CH_2 = CR$$
$$\quad COO(C_3H_6O)m(CF_2H_4O)nH$$
$$CH_2 = CR$$
$$\quad CONH(CH_2)_3NH_2$$

In the above formulae, R is hydrogen or a methyl group and n and m are integers greater than or equal to one and preferably one to twenty.

Both the fluorine-containing monomer and the monomer containing hydrophilic groups may be used singly or in combinations of two or more types. And if needed, other vinyl monomers, such as alkyl esters or acrylic acid or methacrylic acid, esters of trimethylol propane or other such polyhydric alcohol and acrylic acid or methacrylic acid, and the like can also be used jointly with the above-mentioned fluorine-containing monomer and the monomer containing hydrophilic groups.

The copolymer of vinyl alcohol with the fluorine-containing monomer may be prepared by saponifying a copolymer of vinyl acetate with the fluorine-containing monomer to thereby convert the acetate group contained in the copolymer into the hydroxyl group. In this case, all of the acetate groups contained in the copolymer are not necessarily replaced by the hydroxyl group and the conversion of the acetate groups into the hydroxyl groups may be carried out to the extent needed to provide the copolymer with hydrophilic properties.

The fluorine content of the fluorine-containing hydrophilic copolymer to be used in the present invention may range usually from 2% to 60%, preferably from 10% to 60%, and most preferably 20%–60% on a weight basis. If the fluorine content of the fluorine-containing hydrophilic copolymer becomes too high, on the one hand, the hydrophilic properties of the polymer may be lessened, though the heat resistance becomes better. If the fluorine content becomes too low, on the other hand, adhesion of the fluorine-containing hydrophilic polymer to the porous fluoropolymer sheet may be reduced and the heat resistance may be decreased.

The equivalent weight is the formula weight divided by the number of functional units in the formula and will be generally between 45 and 700, preferably, 60–500 and most preferably, 60–450.

If the equivalent weight is lower than 45, the water solubility of the fluorine-containing hydrophilic copolymer may be too high and the fluorine-containing copolymer will elute away with water; and if the equivalent weight is higher than 700, the hydrophilic properties will be lessened, but the interaction between the copolymer and the porous sheet will be increased and thus the copolymer will not tend to elute away.

The following Table provides the mole % fluorine monomer units in the copolymer, the fluorine weight % (F-wt %) and the equivalent weight (EqW) for a number of copolymers (where VOH is vinyl alcohol):

| Copolymer | Molar Ratio in Copolymer | | Mole % of F-monomer Units in copolymer | F-wt % | Eq-W |
|---|---|---|---|---|---|
| $(CF_2 = CF_2)x/(VOH)y$ | x = 1, | y = 40 | 2.4 | 4.2 | 45.5 |
| | 1, | 30 | 3.2 | 5.5 | 46.4 |
| | 1, | 20 | 4.8 | 7.9 | 48.0 |
| | 1, | 10 | 9.1 | 14.3 | 53 |
| | 1, | 4 | 20 | 27.5 | 68 |
| | 1, | 1 | 50 | 53.1 | 143 |
| | 10, | 1 | 91 | 72.8 | 1043 |
| $(CF_2 = CH_2)x/(VOH)y$ | x = 1, | y = 40 | 2.4 | 2.1 | 44.6 |
| | 1, | 30 | 3.2 | 2.8 | 45.2 |
| | 1, | 20 | 4.8 | 4.1 | 46.2 |

-continued

| Copolymer | Molar Ratio in Copolymer | | Mole % of F-monomer Units in copolymer | F-wt % | Eq-W |
|---|---|---|---|---|---|
| | 1, | 10 | 9.1 | 7.5 | 49 |
| | 1, | 4 | 20 | — | — |
| | 10 | 1 | 91 | 55.6 | 683 |
| $(CFH = CH_2)_x /(VOH)_y$ | $x = 1,$ | $y = 40$ | 2.4 | 1.1 | 44.2 |
| | 1, | 30 | 3.2 | 1.4 | 44.6 |
| | 1, | 20 | 4.8 | 2.1 | 45.3 |
| | 1, | 10 | 9.1 | 4.0 | 47.6 |
| | 1, | 4 | 20 | — | — |
| | 1, | 1 | 50 | 21.3 | 89 |
| | 10, | 1 | 91 | 37.8 | 503 |
| $(CF_2 = CFCl)_x /(VOH)_y$ | $x = 1,$ | $y = 40$ | 2.4 | 3.1 | 46.0 |
| | 1, | 30 | 3.2 | 4.0 | 46.9 |
| | 1, | 20 | 4.8 | 5.8 | 48.9 |
| | 1, | 10 | 9.1 | 10.4 | 54.6 |
| | 1, | 4 | 20 | — | — |
| | 1, | 1 | 50 | 35.8 | 159 |
| | 10, | 1 | 91 | 47.2 | 1208 |
| $(CF_2 = CCl_2)_x /(VOH)_y$ | $x = 1,$ | $y = 40$ | 2.4 | 2.0 | 46.5 |
| | 1, | 30 | 3.2 | 2.7 | 47.7 |
| | 1, | 20 | 4.8 | 3.8 | 50.0 |
| | 1, | 10 | 9.1 | 6.7 | 57 |
| | 1, | 4 | 20 | — | — |
| | 1, | 1 | 50 | 20.8 | 183 |
| | 10, | 1 | 91 | 26.3 | 1442 |

The porous fluoropolymer article coated with the hydrophilic fluorine-containing copolymer may be prepared, for example, by dissolving the hydrophilic fluorine-containing copolymer in an organic solvent such as, for example, an alcohol, ketone, ester, amide or hydrocarbon, and coating the surface of the porous fluoropolymer article with the resulting solution, for example by means of rolls or by spraying; or, after first covering the surface to remain hydrophobic to prevent it from being contacted by the solution, by immersing the article in the solution and drying the resulting product. This procedure allows the hydrophilic fluorine-containing copolymer to adhere to the surface of the fluoropolymer article, thereby enabling an aqueous liquid to wet the surface but resisting its passage through the fine pores. Although the amount of the fluorine-containing hydrophilic polymer to adhere to the substrate may vary with the porosity of the porous fluoropolymer article used, and so on, the amount may be in the range usually from 0.5% to 5% by weight, preferably from 1% to 3% by weight, with respect to the weight of the resulting final product.

The hydrophilic porous fluoropolymer article of the present invention may also be prepared by coating the porous article with a solution of a copolymer in an organic solvent, such a copolymer being comprised of the fluorine-containing monomer with a monomer having a hydrophobic group convertible into a hydrophilic group, such as vinyl acetate, drying the substrate and converting at least a portion of the hydrophobic groups into the hydrophilic groups.

Another embodiment of the gas-diffusion article of the invention may be prepared by immersing a thin porous expanded polytetrafluoroethylene film into a solution containing the hydrophilic fluorine-containing copolymer, drying the impregnated film, and tightly wrapping the hydrophilic porous expanded polytetrafluoroethylene film around the perimeter of a hydrophobic fluoropolymer tube.

When the gas-diffusion article of the invention is in the form of a tube, its wall thickness is about 0.1 to 5 mm, preferably about 0.1 to 2 mm. When it is in sheet or film form, its thickness is about 0.025 to 3 mm, preferably about 0.025 to 1 mm, and when it is in plate form, its thickness is about 1 to 20 mm, preferably 1 to 10 mm.

The porous gas-diffusing fluoropolymer article of the present invention has a structure in which the surface of the porous fluoropolymer article to be contacted by aqueous liquid is hydrophilic so that aqueous liquids readily wet the surface and, as gas is flowed through the porous material, cause fine gas bubbles to be generated and released from the surface into the liquid. The hydrophobic internal structure of the gas-diffusing fluoropolymer article limits penetration of aqueous liquid into the pores thus permitting gas flow to be initiated at lower pressures.

The porous fluoropolymer gas-diffusion articles of the invention can be used in many hostile environments as they are remarkably durable in acid and alkaline liquids and are high in heat resistance and chemical resistance because they are comprised of fluoropolymer material as a whole.

TEST PROCEDURES

Thickness

Thickness was measured with a dial thickness gauge having an accuracy of 1/1000 of a millimeter.

Porosity

Preimpregnation porosity is found by measuring the density of the sample. Full density of PTFE is 2.2 g/cm$^3$. The porosity is found by using the equation:

$$\text{Porosity} = \frac{2.2 - \text{density of sample}}{2.2} \times 100$$

On calculating the post-impregnation porosity the full density (2.1) of an impregnated sheet was used instead of 2.2.

Ethanol Bubble Point (EBP)

EBP was determined by spreading ethanol on the surface of the sheet specimen and placing the specimen horizonally in a clamp device. Air was blown from underneath. The EBP is the initial pressure in kg/cm$^2$ at which air bubbles appear continuously from the opposite surface.

Gurley Number (GN)

GN is determined by measuring the time required for 100 cm$^3$ air to flow through 6.45 cm$^2$ sample area under the pressure of 12.4 cm H$_2$O.

Fluorine and Hydroxyl Group Content

Fluorine content and hydroxyl group content of the copolymer were determined by calculation from the result of the elemental analysis of the copolymer.

Hydrophilicity

Initial hydrophilicity was determined by dropping a drop of water on the surface of a sheet of sample from a height of 5 cm and measuring the time it takes for the drop to be absorbed.

Degree of hydrophilicity is as follows:
A = absorbed within 1 second
B = is eventually absorbed
C = is absorbed only by applying pressure
D = is not absorbed but contact angle becomes smaller
E = is not absorbed, i.e., it repels water. "E" is typical of porous expanded PTFE.

Flow Time

Flow time is the time required to pull 200 cc of water at 1 atmospheric vacuum through a 35 mm diameter sample. The sample was placed in a fixed horizontal position and the vacuum was pulled. Then water was poured on top. For preimpregnation measurements the sheet was first impregnated with ethanol to make the sheet compatible with water.

Water Permeability (WP)

WP was determined by the equation $$WP = \frac{200}{\text{Flow Time in minutes}} \times 1.75^2 \times 3.14 \text{ (cm}^3/\text{cm}^2/\text{min)}$$

Durability

Durability of the impregnated sheet is expressed by its Hydrophilicity rating after five Flow Time tests with drying after each test (Method 1), or after passage of 10 liters of water through the sheet using Flow Time equipment and procedure (Method 2).

Heat Resistance

Heat resistance was measured by fixing the sheet on a tenter frame and then placing the material in an air oven controlled at testing temperature, for the time periods specified, followed by measuring for hydrophilicity as described above.

Resistance to Acids and Bases

Samples were immersed in the liquid for the time and at the temperature stated in the examples. The samples were washed with water and then dried, after which the samples are given the Hydrophilicity Test.

Resistance to Solvents

The following solvents, in the indicated quantities, are flowed through the sheet using the Flow Time test apparatus, after which the sheet samples are given the Hydrophilicity Test.

| Methanol | 300 ml |
| Ethanol | 2000 ml |
| Acetone | 5000 ml |

Methanol is a good solvent of the hydrophilic copolymer of reference examples 1 and 3. Ethanol and acetone are not good solvents of the copolymer.

REFERENCE EXAMPLE 1

A tetrafluoroethylene/vinyl alcohol copolymer (a saponified tetrafluoroethylene/vinyl alcohol copolymer with a degree of saponification of 100%, a fluorine content of 27 wt %, and a hydroxyl group content of 14.5 mmol/g) was dissolved in one liter of methanol to prepare a 0.2 wt % methanol solution. A porous polytetrafluoroethylene sheet with a thickness of 40 micrometers and a porosity of 80% was immersed in and impregnated with the methanol solution, fixed on a tenter frame, and dried at 50° C. for five minutes. The same process was repeated five times to produce a hydrophilic porous sheet whose hydrophilicity received an A rating and whose flow time was 60 seconds. The thickness of this article was 30 micrometers, its porosity was 70%, its pore diameter was 0.2 micrometers and its WP was 20 cm$^3$/cm$^2$/minute.

The original good hydrophilicity was maintained after 24 hours at a heat resistance test temperature of 120° C., but at at 135° C. the hydrophilicity was lost.

Upon immersing the resulting sheet in water, no substances were dissolved by the water (i.e., no elution of copolymer), and no changes were indicated when it was immersed in boiling water. It was found that the sheet exhibited high acid resistance with respect to 12 N hydrochloric acid at room temperature, and 1 N hydrochloric acid at 80° C.; and also exhibited high resistance to 5 N sodium hydroxide at room temperature, and 1 N sodium hydroxide at 80° C.

REFERENCE EXAMPLE 2

A tetrafluoroethylene/vinyl acetate copolymer was dissolved in methyl ethyl ketone to prepare a 0.3 wt % solution. A porous polytetrafluoroethylene sheet with a thickness of 40 micrometers and a porosity of 80% was impregnated with the solution, fixed on a tenter frame, and dried at 60° C. for five minutes. The same process was repeated five times. The copolymer was saponified by immersing the sheet in ethanol containing sodium methoxide, and then heat treating it for 30 minutes, after which the hydrophilic sheet was washed with water. This sheet displayed the same characteristics as the film in Reference Example 1.

REFERENCE EXAMPLE 3

A porous polytetrafluoroethylene sheet with a thickness of 48 micrometers, a GN of 6.1 seconds, an EBP of 1.15 kg/cm$^2$, a porosity of 76%, and a flow time of 36 seconds was immersed for 30 seconds in a 1% methanol solution of the copolymer used in Reference Example 1, fixed in a tenter frame after removal from the solution, and dried at room temperature for one hour. The characteristics of the sheet thus obtained were as follows: The copolymer content of the sheet was 0.75 kg/m$^2$, the sheet thickness was 36 micrometers, its GN was 10.4 seconds, its EBP was 1.2 kg/cm$^2$, its porosity was 71%, its flow time was 56 seconds, and its WP was 20 cm³/cm²/minute.

The resulting sheets of Reference Examples 1, 2, and 3 were tested for durability by both Method 1 and Method 2 and, in each case, had a hydrophilicity test rating of A. Acid resistance, alkali resistance, and heat resistance of the sheets were as reported for the sheet of Reference Example 1. Solvent resistance of the sheets was tested as described above and, in each case, resulted in hydrophilicity test ratings of A.

EXAMPLE 1

The exterior surface of a porous polytetrafluoroethylene tube with a wall thickness of 1 mm, a porosity of 50%, and a pore diameter of about 0.2 micrometers was degreased and washed. The exterior surface of the tube was coated with a methyl alcohol solution containing 1.5 wt % of a tetrafluoroethylene/vinyl alcohol copolymer (a saponified tetrafluoroethylene/vinyl alcohol copolymer with a degree of saponification of 100%, a fluorine content of 27 wt %, and a hydroxyl group content of 14.5 mmol/g), after which the methanol was removed at room temperature, and a porous gas-diffusion article of the invention obtained wherein only the exterior surface of the article had been rendered hydrophilic.

Next, one end of the diffusion tube was closed and the other end connected to a compressed-air supply. The tube was placed under water and, when air pressure was applied to the inside of the tube, bubbles were emitted from the surface of the tube. Flow through the gas-diffusion material was initiated at a pressure of 0.2 kg/cm², and fine bubbles with a diameter of 1 mm or less were generated.

For comparative purposes, a section of the untreated polytetrafluoroethylene tube described above was tested in the same manner. The pressure to initiate flow through the porous polytetrafluoroethylene tube was 0.05 kg/cm², and the bubbles were large, 3 to 4 mm in diameter.

EXAMPLE 2

A porous polytetrafluoroethylene sheet with a thickness of 50 micrometers, a porosity of 60%, and a pore diameter of 0.2 micrometers was immersed in a 2 wt % solution of the fluorine-containing copolymer described in Example 1, and the solution was used to thoroughly impregnate the entire film, after which the methanol was removed through evaporation at room temperature.

Next, the hydrophilic copolymer-impregnated porous polytetrafluoroethylene sheet described above was wound and fixed on the outer surface of the nontreated polytetrafluoroethylene tube described in Practical Example 1, and a porous gas-diffusion article of the invention was thereby obtained.

The gas-diffusion tube was tested as described in Example 1. The pressure to initiate flow through the gas-diffusion material was 0.1 kg/cm2 and fine bubbles, with a diameter of 1 mm or less, were produced.

I claim:

1. A porous gas-diffusing article comprising a porous fluoropolymer article having
   (a) a first surface coated with a hydrophilic fluorine-containing copolymer comprising (i) units of a fluorine-containing monomer and (ii) units of a non-fluorinated vinyl monomer containing a hydrophilic functional group; wherein the amount of copolymer present is sufficient to impart increased hydrophilicity to the article surface, and,
   (b) a hydrophobic second surface and hydrophobic internal structure resistant to penetration of water and aqueous liquids.

2. The porous gas-diffusing article as recited in claim 1, wherein the porous fluoropolymer article is a porous fluoropolymer sheet.

3. The porous gas-diffusing article as recited in claim 2, wherein the porous fluoropolymer article is a porous fluoropolymer tube.

4. The porous gas-diffusing article of claim 1, 2, or 3, wherein the porous fluoropolymer article is a porous polytetrafluoroethylene article.

5. The porous gas-diffusing article of claim 1, 2, or 3, wherein the fluorine content of the hydrophilic fluorine-containing polymer is between 2 and 60 percent by weight of the copolymer, and wherein the ratio of the formula weight of the recurring units of the copolymer to the number of functional groups in the formula is between 45 and 700.

6. A porous gas-diffusing article comprising a porous fluoropolymer tube, having on its outer surface a porous fluoropolymer sheet having continuous pores through the sheet, in which at least a portion of the interior of the sheet is coated with a hydrophilic fluorine-containing copolymer comprising (i) units of a fluorine containing monomer and (ii) units of a non-fluorinated vinyl monomer containing a hydrophilic functional group; wherein the amount of the copolymer present is sufficient to impart increased hydrophilicity to the fluoropolymer sheet.

7. The porous gas-diffusing article as recited in claim 6, wherein the porous fluoropolymer sheet is a porous polytetrafluoroethylene sheet.

8. The porous gas-diffusing article of claim 7, wherein the porous fluoropolymer tube is a porous polytetrafluoroethylene tube.

9. The porous gas-diffusing article of claim 6, 7, or 8, wherein the fluorine content of the hydrophilic fluorine-containing polymer is between 2 and 60 percent by weight of the copolymer, and wherein the ratio of the formula weight of the recurring units of the copolymer to the number of functional groups in the formula is between 45 and 700.

* * * * *